US009030594B1

(12) United States Patent
Bhakta et al.

(10) Patent No.: US 9,030,594 B1
(45) Date of Patent: May 12, 2015

(54) APPLYING PHASE TRANSFER FUNCTION

(75) Inventors: Vikrant R. Bhakta, Dallas, TX (US); Manjunath Somayaji, Arlington, TX (US); Marc P. Christensen, McKinney, TX (US)

(73) Assignee: Southern Methodist University, Dallas, TX (US)

( * ) Notice: Subject to any disclaimer, the term of this patent is extended or adjusted under 35 U.S.C. 154(b) by 290 days.

(21) Appl. No.: 13/451,022

(22) Filed: Apr. 19, 2012

(51) Int. Cl.
*H04N 5/225* (2006.01)
*H04N 5/232* (2006.01)
*G06T 5/00* (2006.01)

(52) U.S. Cl.
CPC ............ *H04N 5/23212* (2013.01); *G06T 5/003* (2013.01)

(58) Field of Classification Search
CPC .......................... G06T 5/003; G02B 27/4205
See application file for complete search history.

(56) References Cited

U.S. PATENT DOCUMENTS

| | | | |
|---|---|---|---|
| 5,175,698 A * | 12/1992 | Barbanell | 702/112 |
| 5,616,912 A | 4/1997 | Robinson et al. | |
| 5,912,768 A | 6/1999 | Sissom et al. | |
| 6,229,913 B1 | 5/2001 | Nayar et al. | |
| 7,019,826 B2 | 3/2006 | Vook et al. | |
| 7,518,712 B2 | 4/2009 | Sadoulet et al. | |
| 2003/0173502 A1 * | 9/2003 | Dowski et al. | 250/216 |
| 2010/0271372 A1 * | 10/2010 | Kimura et al. | 345/428 |
| 2011/0135213 A1 * | 6/2011 | Hatakeyama | 382/254 |
| 2011/0135216 A1 * | 6/2011 | Hatakeyama | 382/260 |
| 2011/0285879 A1 * | 11/2011 | Hatakeyama | 348/241 |
| 2011/0292257 A1 * | 12/2011 | Hatakeyama | 348/242 |
| 2012/0057013 A1 * | 3/2012 | Ishiwata | 348/78 |

OTHER PUBLICATIONS

J. W. Goodman, Introduction to Fourier Optics, Chap. 6, pp. 146-151 (McGraw-Hill, second edition, 1996).
U.S. Appl. No. 13/178,403, filed Jul. 7, 2011, Rangarajan et al.
U.S. Appl. No. 13/026,141, filed Feb. 11, 2011, Bhakta et al.
U.S. Appl. No. 12/785,334, filed May 21, 2010, Bhakta et al.
V. R. Bhakta, M. Somayaji, and M. P. Christensen, "Applications of the phase transfer function of digital incoherent imaging systems," Appl. Opt. 51, A17-A26 (2012).
V R. Bhakta, M Somayaji, and M P. Christensen, "Effects of sampling on the phase transfer function of incoherent imaging systems," Opt. Express 19, 24609-24626 (2011).
M. Somayaji, V. R. Bhakta, and M. P. Christensen, "Experimental evidence of the theoretical spatial frequency response of cubic phase mask wavefront coding imaging systems," Opt. Express 20, 1878-1895 (2012).
E. Dowski and W. T. Cathey, "Extended depth of field through wavefront coding," Appl. Optics 41, 1859-1866 (1995).

(Continued)

*Primary Examiner* — Twyler Haskins
*Assistant Examiner* — Dwight C Tejano
(74) *Attorney, Agent, or Firm* — Fish & Richardson P.C.

(57) ABSTRACT

Systems and methods can be configured to perform operations related to digital image processing. In a general aspect, this disclosure describes systems and methods relating to processing digital images for imaging system characterization and image quality enhancement. In some implementations, a method for digital image processing includes measuring a first phase transfer function (PTF) of a first digital image and a second PTF of a second digital image. The second digital image captures a spatially shifted version of the first digital image. The first PTF and the second PTF are compared and a spatial shift of the second image to the first image is determined.

19 Claims, 15 Drawing Sheets

(56) References Cited

OTHER PUBLICATIONS

M. Somayaji and M. P. Christensen, "Enhancing form factor and light collection of multiplex imaging systems by using a cubic phase mask," Appl. Opt. 45, 2911-2923 (2006).

D. Keren, S. Peleg, and R. Brada, Image sequence enhancement using sub-pixel displacement, in Proceedings IEEE Conference on Computer Vision and Pattern Recognition, Jun. 1988, pp. 742-746.

P. Vandewalle, S. Süsstrunk and M. Vetterli, "A Frequency Domain Approach to Registration of Aliased Images with Application to Super-Resolution," EURASIP Journal on Applied Signal Processing (special issue on Super-resolution), vol. 2006, pp. Article ID 71459, 14 pages, 2006.

L. Thibos, R. A. Applegate, J. T. Schwiegerling, and R. Webb, "Standards for reporting the optical aberrations of eyes," in Vision Science and its Applications, OSA Technical Digest (Optical Society of America, 2000.

* cited by examiner

| Mode | WFE | PSF | MTF | PTF |
|---|---|---|---|---|
| 4 | | | | |
| 5 | | | | |
| 6 | | | | |
| 7 | | | | |

FIG. 12A (Cont.)

| Mode | WFE | PSF | MTF | PTF |
|---|---|---|---|---|
| 16 |  |  |  |  |
| 17 |  |  |  |  |
| 18 |  |  |  |  |
| 19 |  |  |  |  |

APPLYING PHASE TRANSFER FUNCTION

TECHNICAL FIELD

This disclosure relates to digital imaging, and more particularly, to process digital images for characterization and quality enhancement.

BACKGROUND

Digital-optical imaging systems can be characterized using their optical transfer function (OTF). The OTF can represent the transformation of the spatial frequency content of the object onto the image plane. The OTF may be decomposed into a magnitude component, represented by the modulation transfer function (MTF) and a phase component, represented by the phase transfer function (PTF). The MTF can represent the contrast reduction at each spatial frequency, whereas the PTF can represent the spatial shift of the spatial frequency. The MTF and the PTF can be used to characterize imaging systems including imaging performance and image quality.

SUMMARY

In a general aspect, this specification describes systems and methods relating to processing digital images for imaging system characterization and image quality enhancement. In some implementations, a method for digital image processing includes measuring a first phase transfer function (PTF) of a first digital image and a second PTF of a second digital image. The second digital image captures a spatially shifted version of the first digital image. The first PTF and the second PTF are compared and a spatial shift of the second image to the first image is determined. In one or more specific aspects, a first derivative of the first PTF is compared with a first derivative of the second PTF. Both of the first derivatives are scaled by $2\pi$. The spatially shifted version registers a sub-pixel accuracy in a digital image. The sub-pixel shift includes translation information within a pixel size of the first image and the second image. The sub-pixel shift can be used in determining high spatial detail information.

In another general aspect, methods and systems can be configured for digital image processing to measure a PTF from one or more digital images. A first derivative of the PTF from the one or more digital images is first calculated. A spatial frequency above which aliasing occurs is determined, based at least in part on one or more of calculated first derivatives of the PTFs from one or more digital images. In some specific aspects, an optical cut-off frequency can be estimated based at least in part on the determined spatial frequency. Aliasing occurs above the spatial frequency. The spatial frequency can be determined by identifying a discontinuity in the one or more calculated first derivatives of the PTFs. Identifying a discontinuity in the one or more calculated first derivatives of the PTFs can include calculating a second derivative of the calculated PTFs.

In another general aspect, a digital image processing method can include capturing a digital image generated from an image system using a phase mask. The imaging system has an optical axis. PTFs at several locations along the optical axis are measured. A through-focus PTF is determined at a spatial frequency based on the measured PTFs. One or more locations along the optical axis for which the through focus PTF exhibits an extremum are identified. In some specific aspects, the through focus PTF can be used to identify optimal configuration of the system components based, at least in part, on the location along the optical axis for which the through focus PTF exhibits an extremum. The through focus PTF can be used to identify the depth information of objects represented in the digital image.

In another general aspect, methods and systems can be configured to correct misalignment in an imaging system. For example, a first PTF of the imaging is measured. The measured PTF is then compared with a reference PTF. At least one optical component of the imaging system is adjusted. The misalignment error can be reduced based on the PTF measured and the reference PTF. In some specific aspects, the reference PTF can be determined from an optics prescription for the imaging system. The sign and magnitude of the measured PTF can correspond to the sign and the magnitude of the misalignment error. The misalignment error can include a difference between a current position and an aligned position. The misalignment reduction can further include using a closed loop iteration that measures a number of updated PTFs and adjusting one less the same number of optical component adjustments (for example, adjusting optical components for n times while measuring PTFs for n+1 times).

In another general aspect, a method can be configured to detect odd-order aberrations in a digital imaging system. The method can include measuring a PTF of a digital image captured with the digital imaging system. The absence or presence of odd order aberrations can be determined based on the linearity of the PTF.

In another general aspect, a method for measuring the strength of a phase mask of a wavefront coding imaging system can include measuring a PTF of a digital image captured with the wavefront coding imaging system. The parameters of the phase mask can be estimated to match the measured PTF.

The details of one or more embodiments of the invention are set forth in the accompanying drawings and the description below. Other features, objects, and advantages of the invention will be apparent from the description and drawings, and from the claims.

DETAILED DESCRIPTION

In general, a digital-optical imaging system can be characterized using its optical transfer function (OTF), which represents the transformation of the spatial frequency content of the object onto the image plane. The OTF may be decomposed into its magnitude, represented by the modulation transfer function (MTF) and its phase, given by the phase transfer function (PTF). The present disclosure describes a PTF-based image processing technique to characterize image system or enhance image quality. For example, in some implementations the PTF-based image processing technique can be used to estimate sub-pixel shift of an image for super-resolution, image fusion/stitching, or other image editing methods. In some implementations, the PTF-based image processing technique can be used to detect and correct misalignment in an optical system. In some implementations, the PTF-based image processing technique can be used to characterize wavefront coding image systems for, for example, extended depth of field processing. In some implementations, the PTF-based image processing technique can be used to detect the extent of aliasing in an image, or to retrieve aberration information in an image.

In some specific aspects, the PTF-based image processing technique can be used for improving the testing, characterization and alignment of digital systems. For example, image-based PTF measurement of incoherent imaging can be used to characterize the performance of imagers that exhibit odd-order aberrations such as coma. Knowledge of the PTF thus obtained may be subsequently used to either correct the imager's optics or to modify reconstruction algorithms to digitally correct the effects of such aberrations in real-time. In some implementations, the PTF measurement can be used in computational imaging systems such as wavefront coded imagers. For example, the OTF of a cubic-phase wavefront coding imager contains a significant phase component, which imparts perceptible shifts to various spatial frequencies in the image. The PTF-based image processing technique can be used to compensate for the shifts. In some instances, in sparse aperture optical systems, the PTF-based image processing techniques can be used to estimate the phase errors between sub-apertures. In some instances, the PTF obtained through image-based measurement may also be employed as a performance metric for adaptive, closed-loop-feedback imaging systems. Similarly, the PTF-based image processing technique can be useful in the alignment of optical components during manufacture and assembly, and may be incorporated into reconstruction algorithms of computational imaging systems to improve image reconstruction results. Other features, aspects, and advantages of the subject matter will become apparent from the following description.

Figure 1:
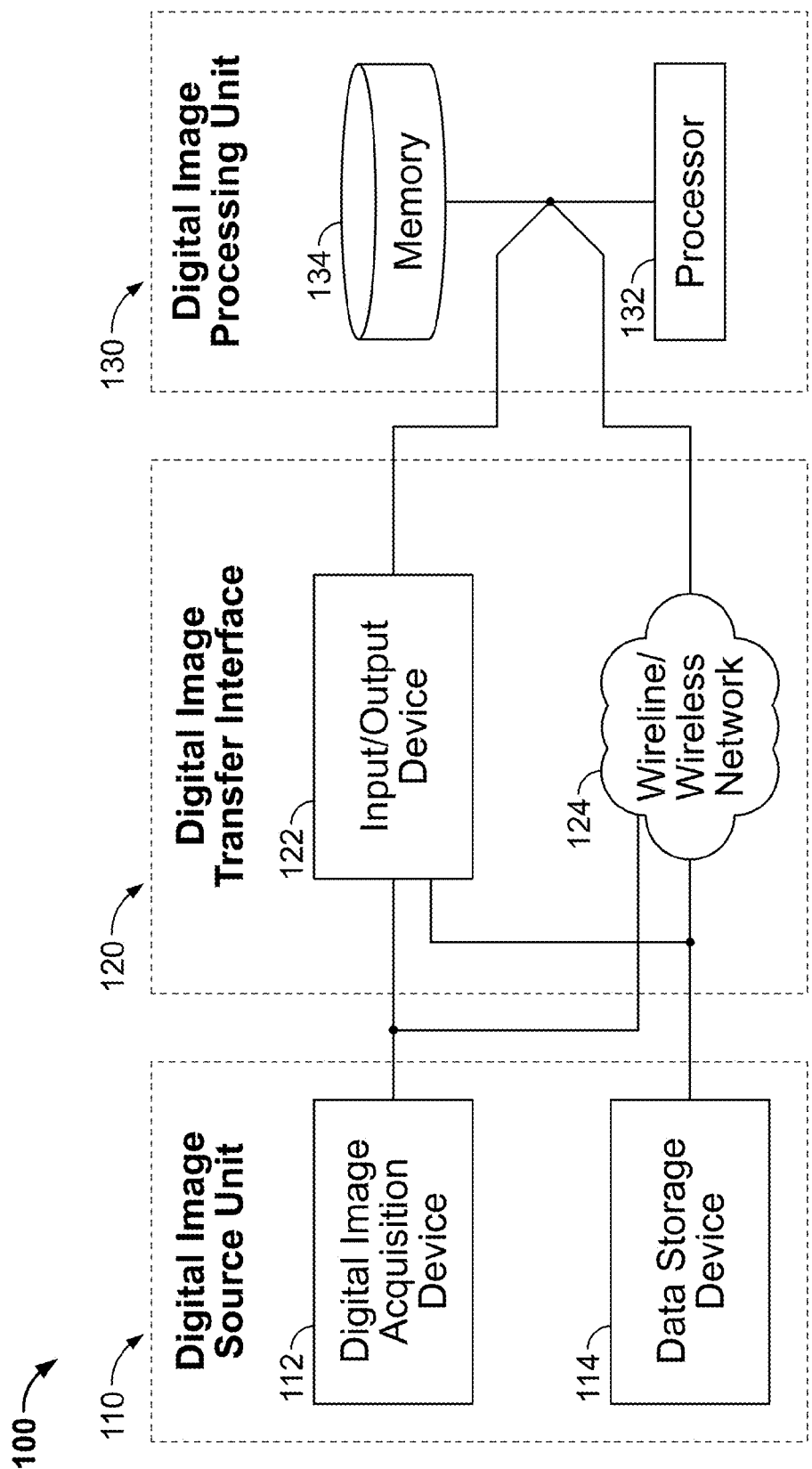
FIG. 1 is a schematic representation of an example system environment in which phase transfer function (PTF) image processing technique can be used.

FIG. 1 is a schematic representation of an example system environment in which phase transfer function image processing technique can be used. At a high level, the example system includes a digital image source unit 110, a digital image transfer interface unit 120 and a digital image processing unit 130. The digital image source unit 110 can include any digital image acquisition device 112, data storage device 114 or any other devices which can perform as a digital image source for digital image processing. For example, the digital image acquisition device 112 may be a digital camera, a smart phone (equipped with a camera), a webcam, a scanner or any other devices which can acquire, receive, transfer or capture image(s). The data storage device 114 can include all forms of non-volatile memory, media and memory devices, including by way of example, semiconductor memory devices, e.g., EPROM, EEPROM, and flash memory devices; memory card; hard drive; magnetic disks, e.g., internal hard disks or removable disks; magneto optical disks; CD-ROM, DVD-ROM and Blu-ray disks. The data storage device may also be a laptop computer, a desktop computer, a server or any other devices which can store image(s). The digital image transfer interface unit 120 can be an interface between the digital image storage unit and the digital image processing unit 130. In other words, the digital image transfer interface 120 can feed into the digital image processing unit 130 the output of the digital image source unit 110. The digital image information can be transferred to the digital image processing unit 130 through wireline and/or wireless communications. Example wireline and wireless digital image transfer interface 120 may include hardware input/output devices 122 (e.g., USB cord, CD-ROM, memory card reader, etc.,) and network 124. Generally, the network 124 facilitates wireless or wireline communications between the components of the environment 100 (i.e., between the digital image storage unit and the digital image processing unit 130), as well as with any other local or remote devices communicably coupled to the network 124 but not illustrated in FIG. 1. The network 124 is illustrated as a single network in FIG. 1, but may be a continuous or discontinuous network without departing from the scope of this disclosure, so long as at least a portion of the network may facilitate communications between senders and recipients. The network 124 may be all or a portion of an enterprise or secured network, while in another instance at least a portion of the network 124 may represent a connection to the Internet. In some instances, a portion of the network 124 may be a virtual private network (VPN), such as, for example, the connection between the client and the server. Further, all or a portion of the network 124 can comprise either a wireline or wireless link. Example wireless links may include 802.11a/b/g/n, 802.20, WiMAX®, Bluetooth® and/or any other appropriate wireless link. In other words, the network 124 encompasses any internal or external network, networks, sub-network, or combination thereof operable to facilitate communications between various computing components inside and outside the illustrated environment. The network 124 may communicate, for example, Internet Protocol (IP) packets, Frame Relay frames, Asynchronous Transfer Mode (ATM) cells, voice, video, data, and other suitable information between network addresses. The network 124 may also include one or more local area networks (LANs), radio access networks (RANs), metropolitan area networks (MANs), wide area networks (WANs), all or a portion of the Internet, and/or any other communication system or systems at one or more locations.

The digital image processing unit 130 can be a major component of the example environment that performs digital image processing. At a high level, the digital image processing unit 130 can include a processor 132 and a memory 134. The digital image processing unit 130 can be incorporated on a camera, a video camera, a laptop computer, a desktop computer, a server or any other device which has a processor 132 and a memory 134.

As illustrated in FIG. 1, the digital image processing unit 130 includes a processor 132. The processor 132 executes one or more hosted applications on the digital image processing unit 130. Although illustrated as a single processor 132 in FIG. 1, two or more processors may be used according to particular needs, desires, or particular embodiments of the environment. Each processor 132 may be a central processing unit (CPU), a blade, an application specific integrated circuit (ASIC), a field-programmable gate array (FPGA), or another suitable component. Generally, the processor 132 executes instructions and manipulates data to perform the operations of the digital image processing unit 130 and, specifically, the one or more plurality of hosted applications. Specifically, the processor 132 executes the functionality required to receive and respond to requests from the clients and their respective client applications, as well as the functionality required to perform the other operations of the hosted application. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

A computer program (also known as a program, software, software application, script, or code) executed by the processor 132 can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network 124.

Aspects of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors 132 suitable for the execution of a computer program include, by way of example, both general and special purpose microprocessors, and any one or more processors of any kind of digital computer. Generally, a processor 132 will receive instructions and data from a read only memory or a random access memory or both. The essential elements of a computer are a processor 132 for performing actions in accordance with instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor 132 and the memory 134 can be supplemented by, or incorporated in, special purpose logic circuitry.

The digital image processing unit 130 can also include memory 134. Memory 134 may be used to store image(s) received from the digital image transfer interface unit 120 and/or after the image(s) is processed by the processor 132. Memory 134 may include any memory 134 or database module and may take the form of volatile or non-volatile memory including, without limitation, magnetic media, optical media, random access memory (RAM), read-only memory (ROM), removable media, or any other suitable local or remote memory component. Memory 134 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the digital image processing unit and its one or more hosted applications. Additionally, memory 134 may include any other appropriate data, such as VPN applications, firmware logs and policies, firewall policies, a security or access log, print or other reporting files, as well as others.

The memory 134 can also store instructions (e.g., computer code) associated with an operating system, computer applications, and/or other resources. The memory 134 can also store application data and data objects that can be interpreted by one or more applications and/or virtual machines running on the computing system. The memory 134 may store additional information, for example, files and instruction associated with an operating system, device drivers, archival data, and/or other types of information.

Figure 2:
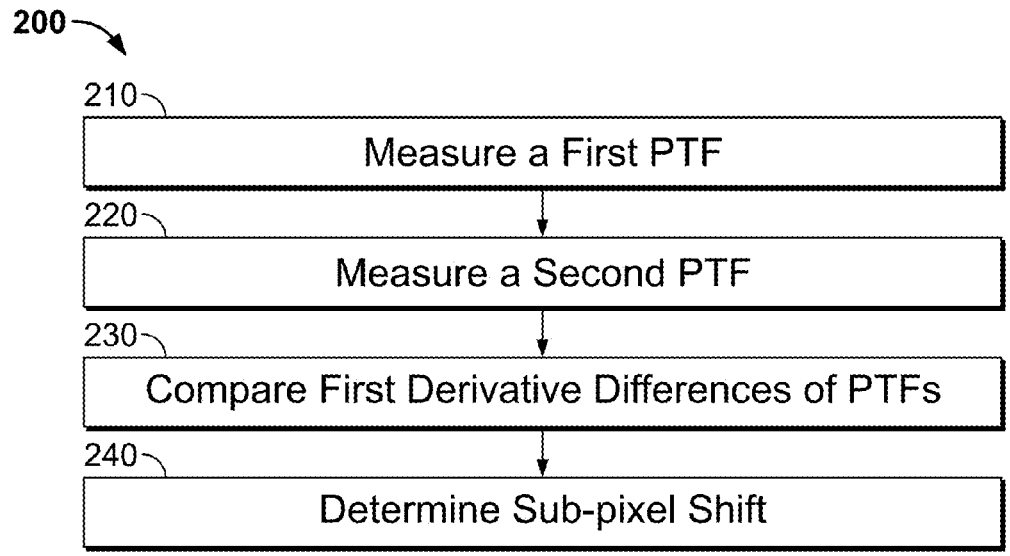
FIG. 2 is a flow chart illustrating a PTF-based image processing technique for estimating sub-pixel shift.

FIG. 2 is a flow chart illustrating a PTF-based image processing technique 200 for estimating sub-pixel shift. At 210, the PTF-based image processing technique 200 measures a first PTF of a first digital image. The first digital image can be any digital image of a two dimensional pixel array. When a point object is sampled onto a detector pixel of the pixel array, the positional information of this object is registered at the center of the imaging pixel. The lateral displacement of the true location (x, y) of the point image from the center of the imaging pixel $(x_s, y_s)$ is known as the sub-pixel shift (or spatial sampling phase). The sub-pixel shift can be denoted as $(\Delta x, \Delta y)$. The following disclosure focuses on the x dimension and can be applied to the y dimension in similar manner. Although a point object is illustrated here for explanation purposes, the processing technique can be applied to other objects besides point objects. $\Delta x$ is referred as the sampling phase. The maximum extent of $\Delta x$ is one-half the pixel pitch p, such that $-p/2 \leq \Delta x \leq p/2$. The first digital image can be modeled with:

$$i(x) = [o(x - \Delta x) \otimes h_o(x) \otimes h_d(x)] \text{comb}\left(\frac{x}{p}\right)$$

where i(x) is the captured image, o(x) is the original signal, $h_o(x)$ is the optical point spread function (PSF), $h_d(x)$ is the detector PSF due to the finite pixel area, p is the pixel pitch, $\Delta x$ is the sampling phase and $\otimes$ denotes a convolution operation. The comb function is given by:

$$\text{comb}\left(\frac{x}{p}\right) = p \sum_{k=-\infty}^{\infty} \delta(x - kp)$$

where k is the pixel index.

In this example, $h_o(x)$ is considered to be space invariant and the system is assumed to have negligible noise. The sampled PTF $\theta_x(u)$ can be derived as:

$$\theta_s(u) = \arctan\left[\frac{\begin{pmatrix} M(u)\sin(\theta(u) - 2\pi\Delta xu) + \\ M(u - 2u_n)\sin(\theta(u - 2u_n) - 2\pi\Delta x(u - 2u_n)) - \\ M(u + 2u_n)\sin(-\theta(u + 2u_n) + 2\pi\Delta x(u + 2u_n)) \end{pmatrix}}{\begin{pmatrix} M(u)\cos(\theta(u) - 2\pi\Delta xu) + \\ M(u - 2u_n)\cos(\theta(u - 2u_n) - 2\pi\Delta x(u - 2u_n)) + \\ M(u + 2u_n)\cos(-\theta(u + 2u_n) + 2\pi\Delta x(u + 2u_n)) \end{pmatrix}}\right]$$

where M(u) and θ(u) are pre-sampled MTF and PTF respectively.

At 210, the PTF can describe features of the first digital image by analyzing the following properties. For example, angular sampling phase $\Phi_x$ is related to the sub-pixel shift by the relationship $$\Phi_x = \frac{2\pi\Delta x}{p}$$

such that $-\pi \leq \Phi_x \leq \pi$. A sampled impulse response kW can then be given by $$h_s(x_s) = [h_o(x_s - \Delta x) \otimes h_d(x)] \times \text{comb}\left(\frac{x}{p}\right)$$

The sampled OTF $H_s(u)$ is then obtained by performing a Fourier transformation operation to the sampled impulse response $h_s(x_s)$.

$$H_s(u) = \sum_{k=-\infty}^{\infty} H(\tilde{u} - 2k\tilde{u}_n)e^{-j2\pi(\tilde{u} - 2k\tilde{u}_n)\Delta x}$$

where is the ũ non-normalized spatial frequency and $\tilde{u}_n = 1/(2p)$ is the detector Nyquist frequency. H is the overall pre-sampled OTF including the optical OTF $H_o$ as well as the detector frequency response $H_d$, that is, $H = H_o \times H_d$. The magnitude and phase of H(u) may be represented by M(ũ) and Θ(ũ), respectively, such that $H(\tilde{u}) = M(\tilde{u})e^{j\Theta(\tilde{u})}$.

A number of properties of the sampled PTF $\Theta_s(\tilde{u})$ can then be derived as the follows.

a) $\Theta_s(0) = 0$.

b)

$$\Theta_s(\tilde{u}_n) = \begin{cases} 2m\pi \text{Re}\{H_s(\tilde{u}_n)\} \geq 0 \\ (2m-1)\pi \text{Re}\{H_s(\tilde{u}_n)\} < 0 \end{cases}, \forall \text{ integer } m.$$

c) $\Theta'_s(0) = \Theta'(0) - 2\pi\Delta x$; $\forall \tilde{u}_0: 0 < \tilde{u}_0 \leq 2\tilde{u}_n$.

d)

$$\Theta'_s(\tilde{u}_n) = \Theta'(\tilde{u}_n) - 2\pi\Delta x + \frac{M'(\tilde{u}_n)}{M(\tilde{u}_n)}\tan\{\Theta(\tilde{u}_n) - 2\pi\tilde{u}_n\Delta x\};$$

$$\forall \tilde{u}_0: \tilde{u}_n < \tilde{u}_0 \leq 2\tilde{u}_n$$

The first property shows that the property of Hermitian symmetry attributed to the optical PTF of an incoherent imaging system may also be extended to sampled incoherent imaging systems, regardless of aliasing. The second property indicates that the sampled OTF at the Nyquist frequency is real and therefore its phase is an integer multiple of π radians, irrespective of the extent of aliasing present in the system. The third and fourth properties apply to the first derivatives of the sampled PTF in the special case of moderate aliasing.

Similar measurement and analysis can be performed at 220, where a second PTF is measured from a second digital image. The second digital image captures a translated version of the first digital image. The translation is under sub-pixel displacement (i.e., smaller than 1p). The sub-pixel translation, or shift, can then be estimated using the two measured PTFs from 210 and 220 using properties derived from the first and the second PTFs.

At 230, the first derivative of the first PTF is compared with the first derivative of the second PTF for estimating sub-pixel shift of the second digital image from the first digital image. For example, as illustrated in the third property of the sampled PTF $\Theta_s(\tilde{u})$, for the first digital image: $\Theta'_{s_1}(0) = \Theta'(0) - 2\pi\Delta x_1$, and for the second digital image: $\Theta'_{s_2}(0) = \Theta'(0) - 2\pi\Delta x_2$, the difference of the two when scaled by 2π, can yield the magnitude of the sub-pixel shift between the first digital image and the second digital image. Thus, at 240, sub-pixel shift (i.e., $\Delta x_2 - \Delta x_1$) can be estimated by $2\pi[\Theta'_{s_1}(0) - \Theta'_{s_2}(0)]$. This is because, for a given imaging system, the pre-sampled PTF Θ(ũ) and its derivative Θ'(ũ) are solely functions of the optical characteristics of the imager. A translational motion of the image then causes a linear change in the sampled PTFs, which is directly proportional to the sampling phase Δx. An example using the PTF-based image processing technique 200 is described below in FIGS. 3A and 3B.

Figure 3A:
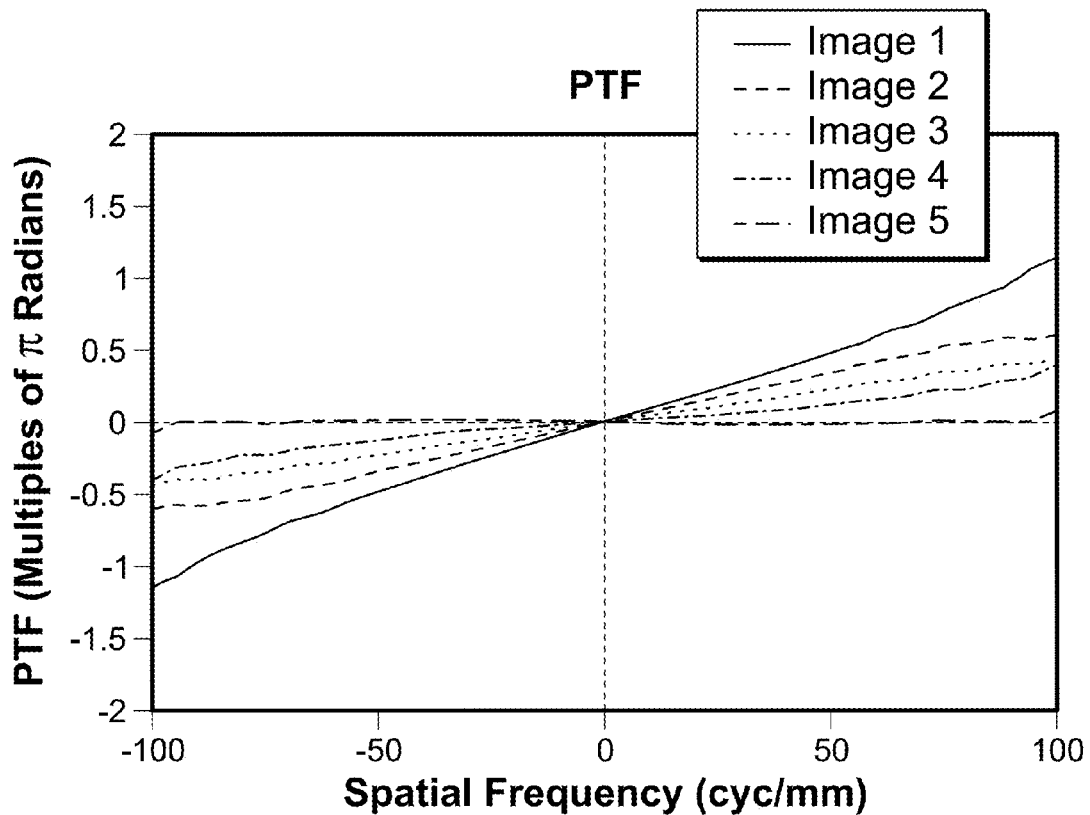
FIGS. 3A and 3B illustrate an image processing example of estimating sub-pixel shift using PTF-based image processing technique.
Figure 3B:
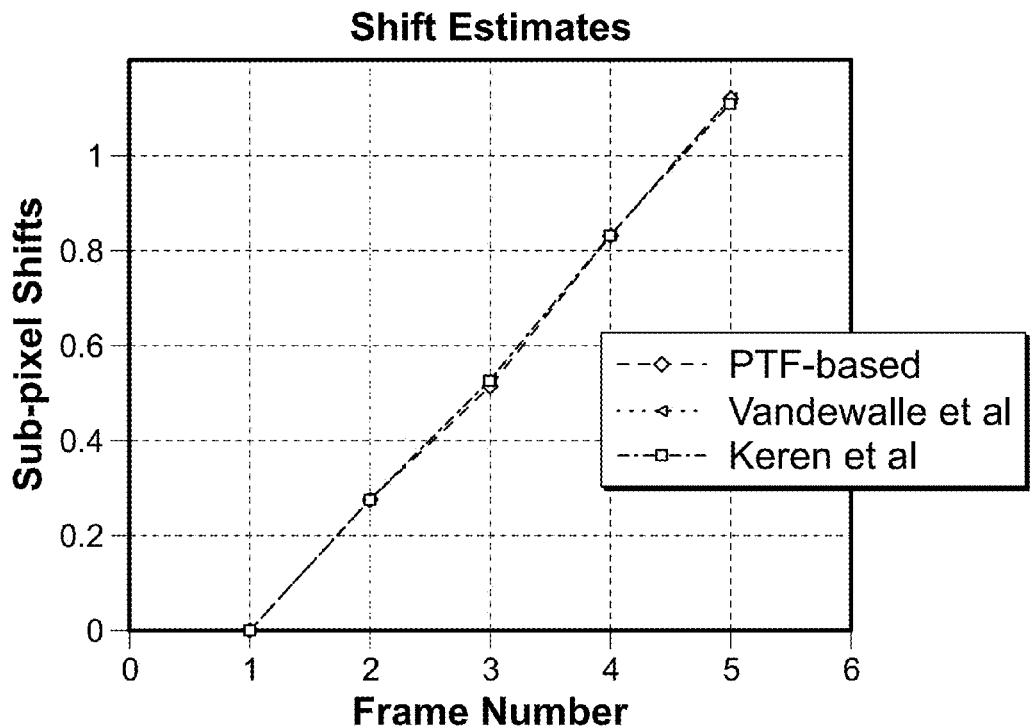

FIGS. 3A and 3B illustrate an image processing example of estimating sub-pixel shift using PTF-based image processing technique. FIG. 3A describes five measured PTFs for different subpixel shifts based on a set of images obtained in a demonstrative experimental setup. FIG. 3B describes the estimated values of sub-pixel shifts for the five different subpixel shifts using the PTF based method, as well as two other reference methods for validation comparison.

Referring first to FIG. 3A, a plot 200 illustrates five experimentally measured PTF in an experimental setup. The x axis of the plot 200 represents spatial frequency in cycle per millimeter. The y axis of the plot 200 represents PTF in terms of multiples of it radians. The experimental setup uses a scaled-up version of an Air Force resolution target placed at 2.9 m from an imaging system. The imaging system includes a 10 bit monochrome camera sported square pixels with a 4.65 μm pixel size, and a 50 mm F/1.8 lens. The camera is mounted on a linear actuator for producing translation motion. The five PTFs displayed in FIG. 3A are captured in a manner that each image is a shifted version of the previous one by 0.25 pixel.

In controlled conditions as described, the plot 200 can be further analyzed to calculate sub-pixel shift that reflect the actual shift value. This is illustrated in FIG. 3B, which plots the slopes of the measured PTFs in FIG. 3A. The slopes are scaled by a factor of 2π for unit conversion. In FIG. 3B, the x axis represent image frame number, as an index for the five shifted images captured in the experiment. The y axis represents sub-pixel shift in pixels. Three sets of data points are used. One is calculated using the PTF-based method, another two are obtained by using the Keren and the Vandewalle methods for validation. From the plotted data, it can be clearly seen that the PTF based method accurately reflects the actual sub-pixel shift controlled in the experiment, and matches other methods.

Figure 4:
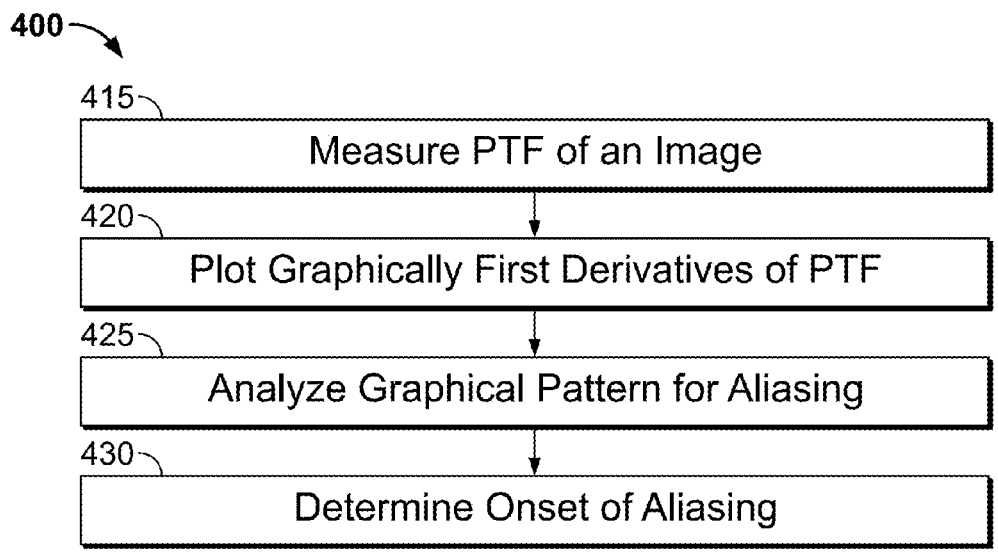
FIG. 4 is a flow chart illustrating a PTF-based image processing technique for detecting and correcting aliasing.

FIG. 4 is a flow chart 400 illustrating a PTF-based image processing technique for detecting and correcting aliasing. At 415, a PTF of an image is measured. The PTF measurement can use various available techniques, for example, optical methods and image-based methods. Optical methods such as wavefront sensing and interferometry are routinely used to measure the wavefront error of imaging systems. In the process, this information may also be readily used to determine the OTF of these imagers. The optical methods may require specialized hardware and need high-precision calibration to ensure their effectiveness. Other methods can be used, for example, realizing a point source at a known object distance to measure the PSF, which is then subjected to a Fourier transform to yield the OTF of the system. Image-based methods seldom require additional hardware and hence offer a more practical alternative to optical methods. One such method is parametric image-based blur estimation. This method uses Gaussian-like PSF models and implicitly assumes that the PSF yielded by the optics is symmetric. A third method is to use several sinusoidal or bar targets of predetermined spatial frequencies. This approach may require several targets, depending on the number of spatial frequencies of interest. Additionally, this approach may necessitate some form of frame of reference in order to accurately identify relative spatial frequency shifts with respect to DC, as well as precise calibration of the experimental setup. One particular technique used for measuring PTF is described in detail in this disclosure.

Figure 5:
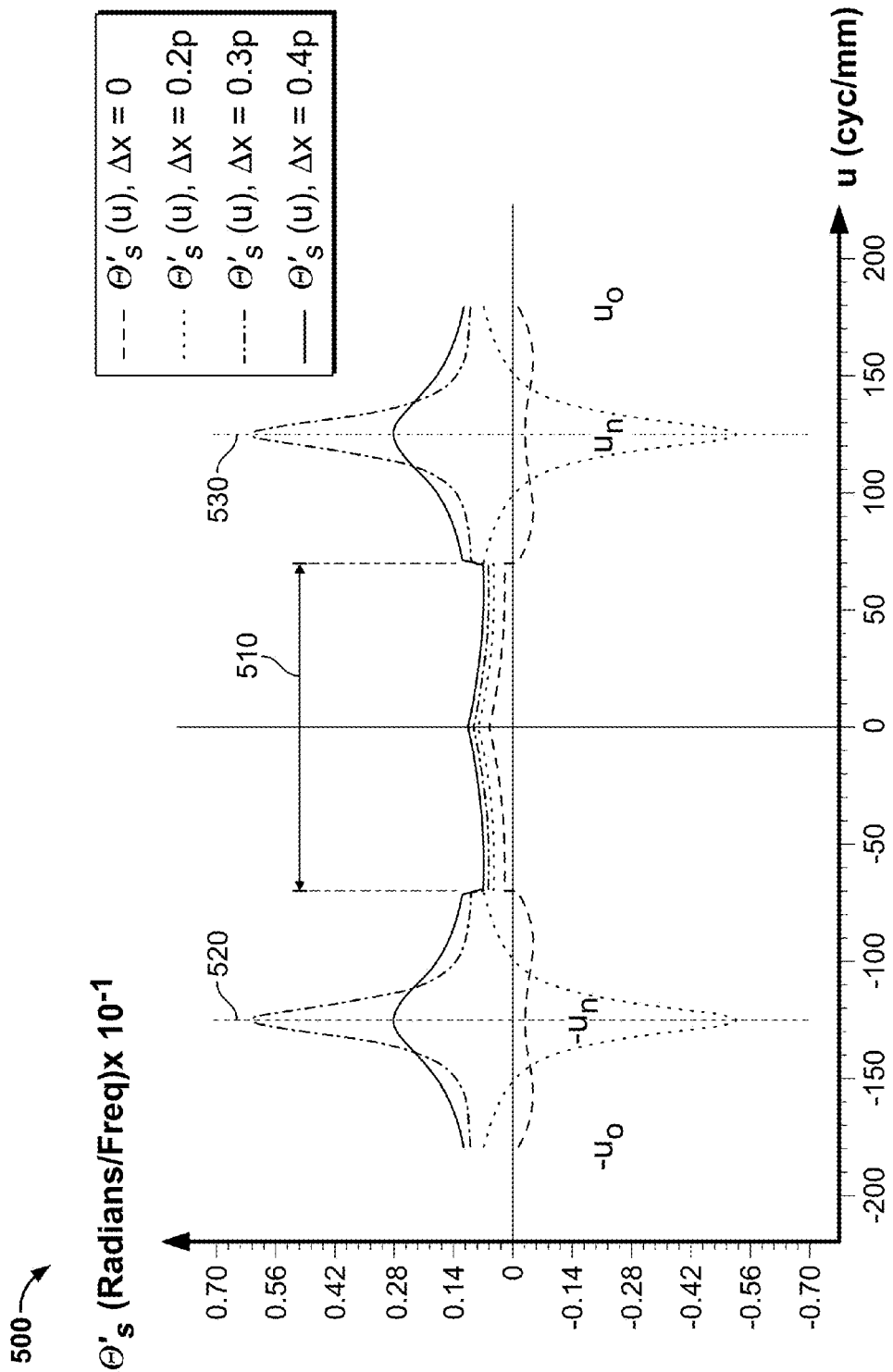
FIG. 5 illustrates an image processing example of detecting aliasing using PTF-based image processing technique.

At 420, the first derivative of the measured PTF is graphically plotted. An example of the plot is shown in FIG. 5, which is further discussed in detail below. The plotted figure can have a distinct pattern for identifying aliasing occurrence. In some implementations, the second derivative of the measured PTF can further be plotted and used to find different distinct patterns for aliasing identification. At 425, the derivative of the PTF is analyzed to determine if aliasing has occurred. In some implementations, the analysis process can be performed by a machine or a computer, which can store a database of reference patterns or pattern generation algorithms to identify the on-going aliasing pattern. Based on the identification result, at 430, the onset of aliasing can be determined. In some implementations, the onset of aliasing can be $u_a=2u_n-u_o$, as further illustrated in FIG. 5.

FIG. 5 illustrates an image processing example 500 of detecting aliasing using PTF-based image processing technique. In the example 500, the first derivatives of four measured PTFs are plotted. The x axis represents the spatial frequency in cycles per millimeters. The y axis represents the first derivative of PTF in radians per frequency. Four sub-pixel shifted data sets are presented in the example 500 to explain various graphical patterns. Three regions in the spatial frequency axis are labeled. The region 510 includes a graphical pattern that indicates no aliasing has occurred; while the regions 520 and 530 include different graphical patterns indicating aliasing occurrence. The region 510 and the region 520 are separated at $u_a=2u_n-u_o$, where a distinct change can be observed. The graphical pattern of the first derivative of PTFs can therefore provide a direct reference for determining the onset of aliasing, and the information can further be used for estimating optical cut-off frequency $u_o$; by using $u_o=u_s-u_a$, where $u_s$ is the detector sampling frequency defined as 1/pixel-pitch. In some implementations, the second derivative of the PTF can further enable identification of aliasing.

Figure 6:
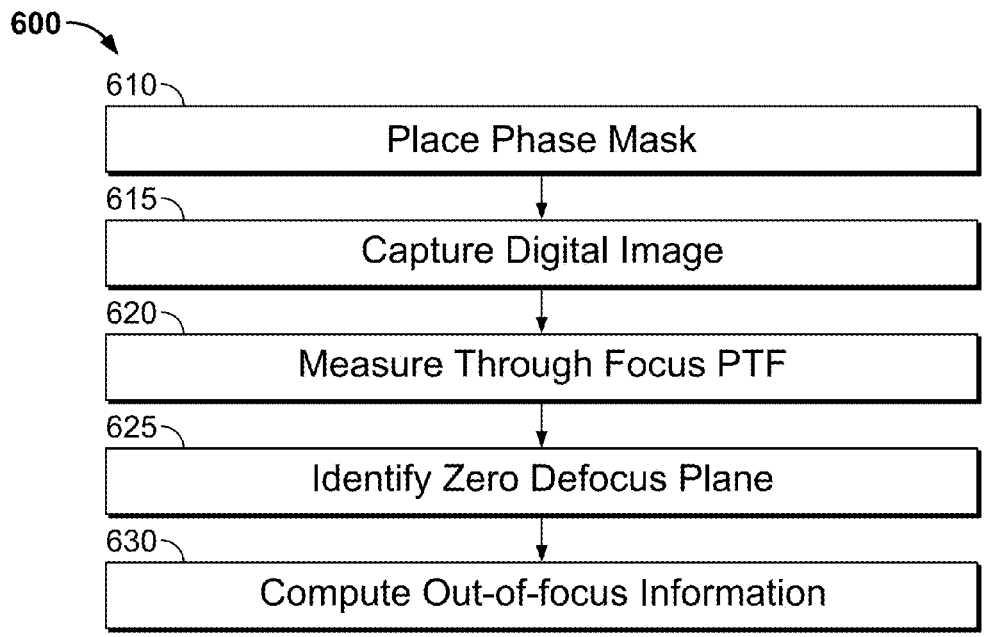
FIG. 6 is a flow chart illustrating a PTF-based image processing technique for depth encoding.

FIG. 6 is a flow chart illustrating a PTF-based image processing technique 600 for depth encoding. The PTF-based image processing technique 600 can be used in wavefront coding imaging systems or other similar optical systems, for example, cubic phase imagers. Wavefront coding is a general way to extend depth of field of incoherent imaging systems. Using wavefront coding for extending depth of field requires knowing the focal plane location, where the defocus wave is zero. The image processing technique 600 can identify the zero defocus plane and use this information to compute out-of-focus information to extend the depth of field. At 610, a phase mask is placed at an exit pupil of an imaging system. The imaging system can include any generic camera such as a point-and-shoot camera, a digital single lens reflex camera, a video camera, a phone camera, a webcam, or others. The phase mask can be a cubic phase mask or other masks that can enable extended depth of field computing. The imaging system captures a digital image for depth encoding at 615. The digital image can be of various formats that include parameters and other information for further computing steps.

To briefly explain the depth encoding at 615, an overview of the MTFs and PTFs of a CPM wavefront coding imager as a function of spatial frequency and defocus is described below. The pupil function is first discussed here. A CPM-WFC imaging system can be realized by introducing a phase mask or function θ(x, y), into a rectangular clear pupil to modify the incoming wavefront (and hence the PSF). Here, (x, y) represent the normalized pupil plane coordinates. For a cubic phase mask, this function is given by $\phi(x, y)=\alpha(x^3+y^3)$, where α is a constant. When considered in conjunction with the wavefront error introduced by defocus, the unit-power, generalized pupil function of a CPM imaging system may be expressed along one dimension (1D)[4]:

$$P(x) = \begin{cases} \frac{1}{\sqrt{2}}\exp[j(\psi x^2 + \alpha x^3)] & |x| \leq 1, \\ 0 & \text{otherwise} \end{cases} \quad (8)$$

A one-dimensional examination of the imaging system suffices since rectangular separability applies to the aperture in this case. The parameter α denotes the strength of the cubic phase mask. It is calculated as $$\alpha = \frac{2\pi\xi}{\lambda}, \quad (9)$$

where ξ is the difference between the minimum and maximum optical path differences introduced by the phase mask along one dimension, and π is the wavelength of light. The term ψ is the defocus parameter, which quantifies the extent of defocus experienced by the imager and is given by [6]

$$\psi = \frac{\pi L^2}{4\lambda}\left(\frac{1}{f} - \frac{1}{z_a} - \frac{1}{z_o}\right), \quad (10)$$

where L is the aperture width, f is the focal length, and $z_o$ and $z_a$ are the distances of the object and image capture planes respectively, from the pupil.

The modulation transfer function is discussed below. The exact OTF of CPM wavefront coding imaging systems is given by [5]

$$H(u, \psi) = \begin{cases} \left(\frac{\pi}{24\alpha u}\right)^{1/2} \exp(j2\alpha u^3) \exp\left(-j\frac{2\psi^2 u}{3\alpha}\right) \times \\ \frac{1}{\sqrt{2}} \{C(b(u)) - C(a(u)) + jS(b(u)) - jS(a(u))\}; \quad 0 < |u| \leq 1 \\ 1; \quad u = 0 \end{cases} \quad (11)$$

where u is the spatial frequency normalized to the diffraction-limited cutoff frequency $\eta_o$ such that $-1 \leq u \leq 1$. In the above equation, the terms C( ) and S( ) denote the Fresnel cosine integral and Fresnel sine integral respectively, whose operands are:

$$a(u) = \left(\frac{12\alpha u}{\pi}\right)^{1/2} \left(\frac{\psi}{3\alpha} - (1 - |u|)\right), \quad (12)$$

$$b(u) = \left(\frac{12\alpha u}{\pi}\right)^{1/2} \left(\frac{\psi}{3\alpha} + (1 - |u|)\right).$$

The MTF $M_t(u,\psi) = |H_t(u,\psi)|$ may be expressed as:

$$M_t(u, \psi) = \left(\frac{\pi}{24\alpha|u|}\right)^{1/2} \times \frac{1}{\sqrt{2}} \{[C(b(u)) - C(a(u))]^2 + [S(b(u)) - S(a(u))]^2\}^{1/2}. \quad (13)$$

In addition to the MTF, a straightforward evaluation of the PTF of CPM wavefront coding imaging systems can be permitted as:

$$\Theta_t(u, \psi) = 2\alpha u^3 - \frac{2\psi^2 u}{3\alpha} + \tan^{-1}\left\{\frac{S(b(u)) - S(a(u))}{C(b(u)) - C(a(u))}\right\}. \quad (14)$$

Given that both the numerator and the denominator of the argument of the arctangent term rapidly oscillate about unity within the usable bandwidth, this contribution to the PTF is a phase value that oscillates about π/4 radians except at u=0, where it becomes zero.

Although the depth of field of the wavefront coding system is larger than the traditional imaging system it is still finite and limited by the MTF and SNR. In view of the finite depth of field of these imaging systems, it therefore becomes desirable to maximize the effective operating range for a given application. In other words, application-specific demands may call for setting the working distance to an optimal location, for which the knowledge of the focal plane location is a prerequisite. Traditionally, the through-focus MTF is the method of choice to locate the in-focus working distance; however, the relative invariance of the MTF to defocus within the depth of field renders this approach largely ineffective. On the other hand, Eq. (9) reveals that the phase of the OTF exhibits a quadratic relationship to ψ(defocus) in addition to an oscillating behavior induced by the Fresnel integrals. This quadratic behavior is exploited for the depth of field of characterization of wavefront coding imaging system.

Practical feasibility of identifying the plane of zero defocus via through-focus PTF information has been investigated by experimentally evaluating the PTF of a cubic phase mask imaging system at different working distances and spatial frequencies. The model# CPM127-R40 phase mask used in this experiment was provided by OmniVision Technologies Inc. The overall lateral phase profile variation across the half-inch (12.7 mm) diameter of its functional surface was specified as 40 waves at 550 nm wavelength. The overall variations include both lateral directions, namely x and y, and hence the total variation along one dimension is one-half the overall variation. The imaging system into which these phase masks were inserted consisted of a single half-inch coated achromatic lens element from Thorlabs (Model number AC127-075-A), with an effective focal length of 75 mm and operating wavelength range of 400 nm to 700 nm. A 7.5 mm square aperture was employed to yield an F/10 imaging system. The detector consisted of a Sumix SMX-M95M monochrome digital sensor with a pixel size and pitch of 2.2 μm square, resulting in half the sampling frequency of 227.27 cyc/mm. For the size of the square aperture used in this experiment, the value of α was calculated as 25.88.

An on-axis point source was used as the target so that its observed image could be directly taken as the PSF of the imaging system and used to measure the OTF. The point source was placed at a distance of 7.5 m from the lens to realize an approximate magnification of 0.01. This source consisted of a 100 μm pinhole illuminated from behind by a white-light LED source (Thorlabs model# MCWHL2). The optical cutoff frequency was calculated to be approximately 180 cyc/mm at the operating wavelength of 550 nm, thereby ensuring an absence of aliasing in the system. Given that the theoretical calculations are for a single wavelength, a color filter with a center wavelength of 550 nm and a full-width-half maximum passband of ±10 nm (Thorlabs model# FB550-10) was utilized to closely replicate monochromatic conditions as well as to achieve near-diffraction-limited imaging performance by the lone imaging lens. The working distance was then varied by incremental steps of 20 μm by moving the sensor using a linear motorized actuator (Zaber actuator model# T-LA13A-S). A set of images of the point source were captured at each working distance and averaged to minimize noise. Each averaged image was then cropped to a smaller region-of-interest (ROI) and a vertical 1D slice of the PSF was extracted from this ROI. The location of the vertical slice was chosen to coincide with the detector column containing the pixel with the greatest intensity value within the image. A Fourier transform operation on this 1D PSF slice then yielded the OTF, from which the PTF was obtained. It is noted that a prerequisite for a 1D slice to be sufficient for analysis is that the pupil must be rectangularly separable, which was true in this case. To ensure that the PSF shift across the sensor plane due to defocus was faithfully captured, the ROI window was kept fixed throughout the sweep range of the sensor.

Returning to FIG. 6, at 620 the through focus PTF of the digital image is measured. The measurement result can be similar to the example shown in FIG. 7 and discussed in detail below. The measured PTF can have a reversed "U" shape that has one identifiable peak. The peak indicates the focal plane, or zero defocus plane. At 625, the focal plane is identified. The identification process can employ various methods and algorithms. Once the location of the focal plane is identified, at 630, out-of-focus information can be computed using wavefront coding.

Figure 7:
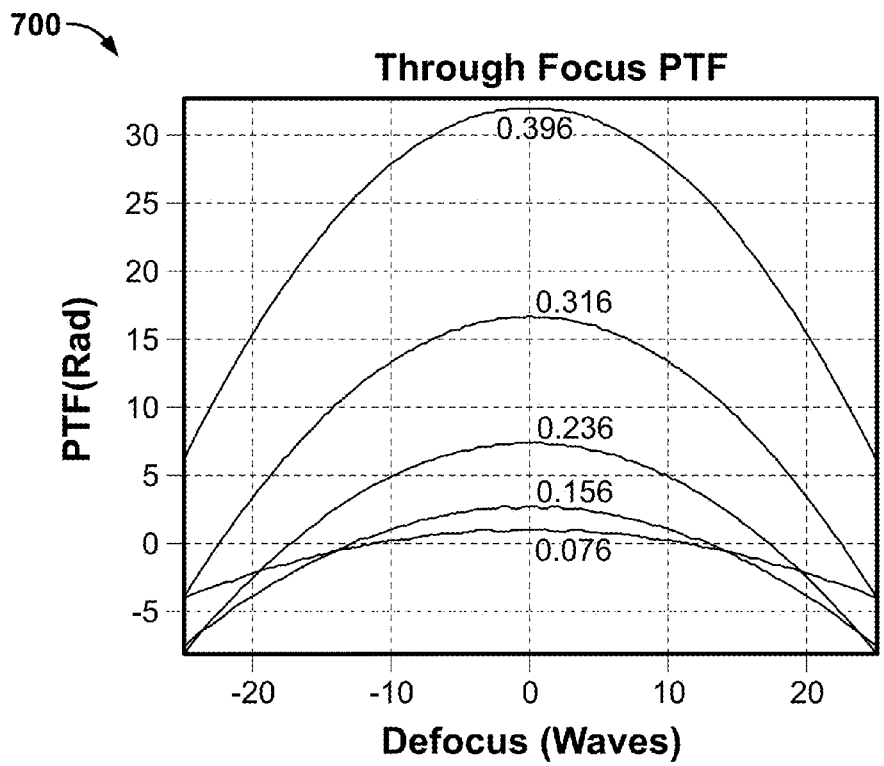
FIG. 7 illustrates an image processing example of depth encoding using PTF-based image processing technique.

FIG. 7 illustrates an image processing example 700 of depth encoding using PTF-based image processing technique. The example 700 illustrates results of measured through-focus PTFs. The x axis represents defocus waves, where the origin (or zero) indicates the focal plane. The y axis represents the measured PTF in radians at 50 cyc/mm. It can be observed from FIG. 7 that the phase of the OTF exhibits a quadratic relationship in addition to an oscillating behavior. The quadratic variation dominates over the oscillating behavior in most practical cubic phase mask imaging systems. The quadratic trend can therefore be extracted from the total PTF. The global peak of the resulting residual PTF would then yield the location of the in-focus plane, as marked by the origin where defocus is zero.

Figure 13:
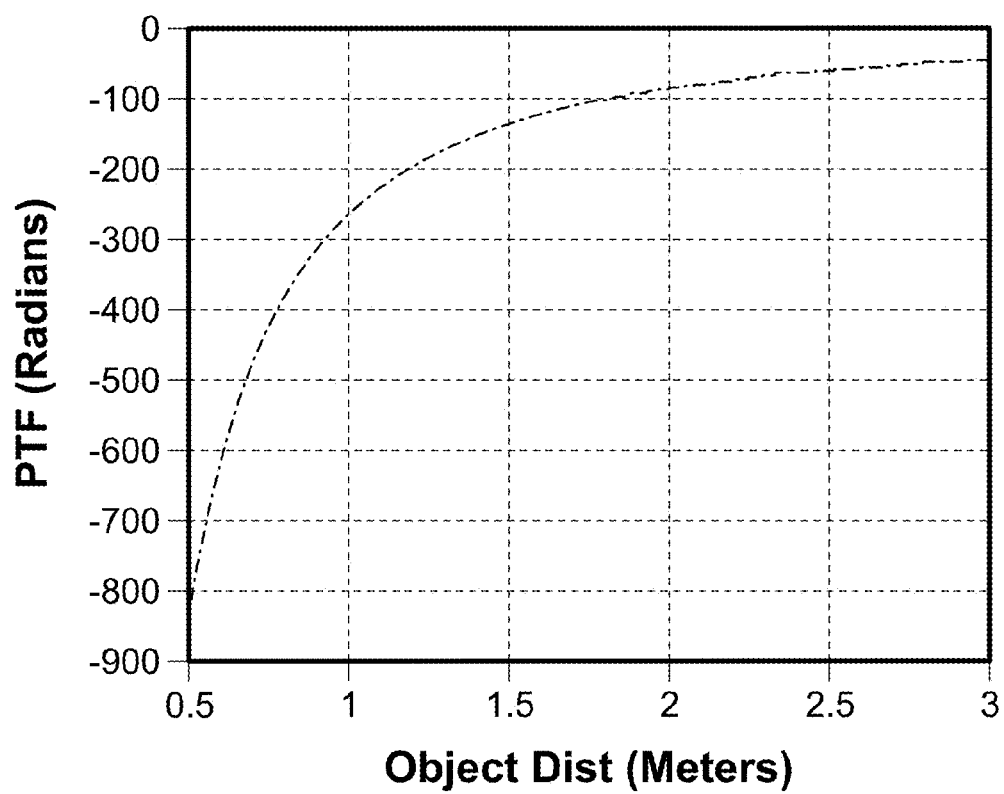
FIG. 13 shows an example relationship between object distance and PTF for an imaging system.

The existing depth estimation approaches can be classified into two categories namely (1) stereo and (2) depth from focus (DFF) and depth form defocus (DFD). The stereo setup utilizes either two cameras or one camera and one projector with the view point disparity. The parallax generated by this disparity is used to recover scene depth. There are many scenarios where it may not be practical to use stereo like arrangement due to space, size or cost constraints. The DFD/DFF approaches rely upon the limited depth of field of either the camera or the projector. But this method will not work in case of a wavefront coded camera because it has depth invariant modulation transfer function (MTF). Whereas, the proposed invention will work with the wavefront coded camera and provide not only the extended depth of field but also the depth information by utilizing the PTF. It can be seen that the PTF has quadratic dependence on the defocus parameter $\psi$ which relates to the object distance by following relationship. Using this relationship, the dependence of the PTF on the object distance can be determined. An example of which is shown in FIG. 13, where the horizontal axis shows the object distance in meters and the vertical axis shows the PTF values at that distance for normalized spatial frequency of 0.5. From the measured PTF the object distance and hence the depth range can be estimated.

Figure 8:
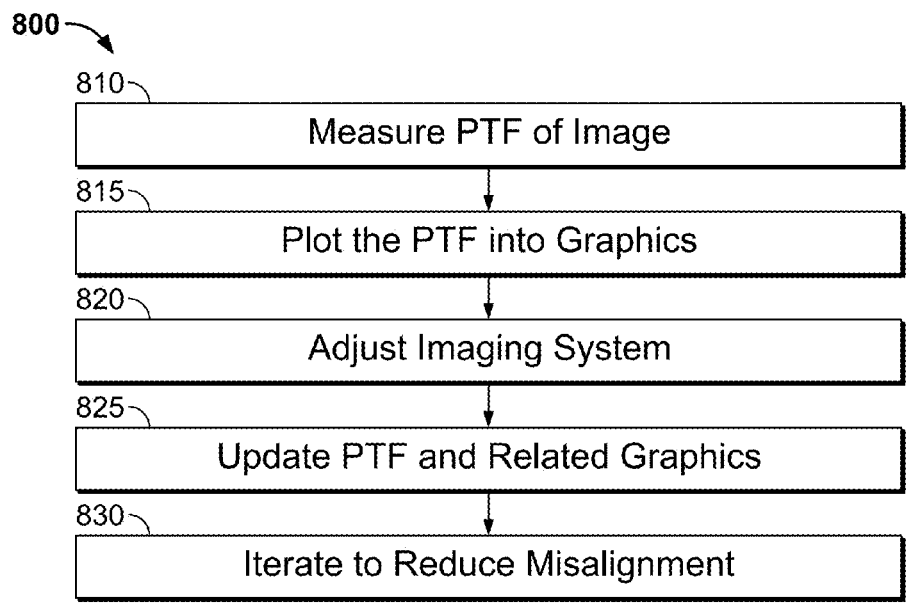
FIG. 8 is a flow chart illustrating a PTF-based image processing technique for detecting and correcting misalignment.

FIG. 8 is a flow chart illustrating a PTF-based image processing technique 800 for detecting and correcting misalignment. The image processing technique 800 can be applied to computer imaging systems with a close loop control for reducing misalignment. At 810, a PTF of a digital imaging system taken with the imaging system is measured. At 815, the measured PTF is plotted into a graphical representation that shows a misalignment error with a substantially distinguishable pattern, for example, such as sign and magnitude. Based on information, at 820, at least one optical component of the imaging system is adjusted for reducing the misalignment. At 825; the PTF is updated for the adjusted imaging system. The updated PTF may be compared with a standard in determining if the recent adjustment performed at 820 is adequate. If the recent adjustment at 820 does not satisfy the standard requirement, further adjustment for the imaging system may be required. At 830, a closed loop iteration can be used to reduce misalignment based on updated PTFs. An example illustrating the technique 800 is shown in FIG. 9.

Figure 9:
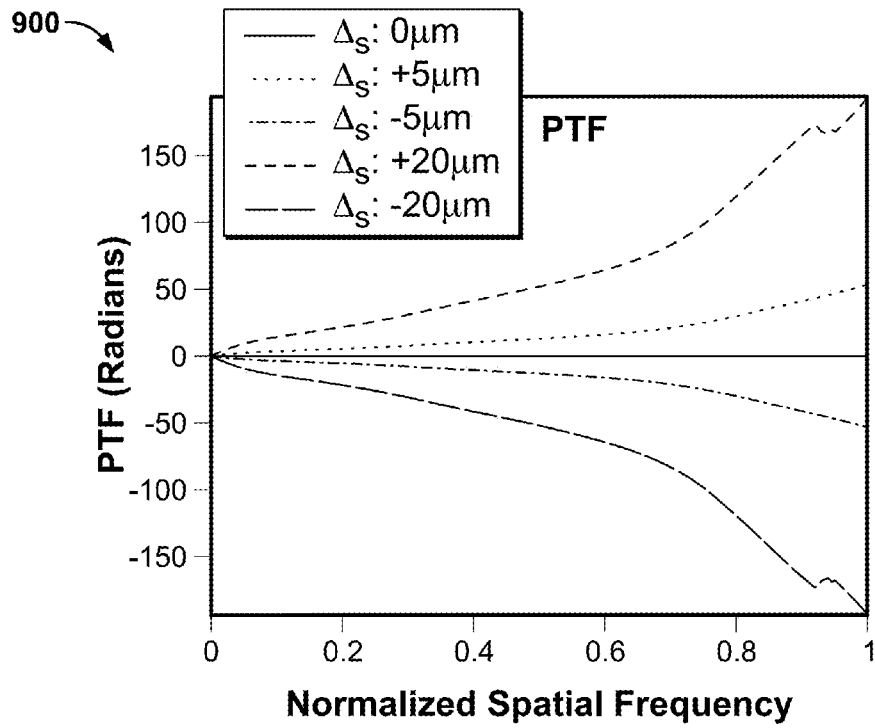
FIG. 9 illustrates an image processing example of detecting misalignment using PTF-based image processing technique.

FIG. 9 illustrates an image processing example 900 of detecting misalignment using PTF-based image processing technique. In the example 900, five data sets of different degrees of misalignment are presented. The x axis shows normalized spatial frequency; and the y axis shows calculated PTFs in terms of multiples of $\pi$ radians. As shown in FIG. 9, different misalignment magnitudes $\Delta s$ are reflected in PTF magnitudes in the normalized plots, for example, the larger the misalignment magnitude, the larger the PTF magnitude. In addition, the direction of the misalignments is also reflected in the signs of the PTF plots, for example, a positive misalignment is corresponded by a positive PTF plot. In some embodiments, the misalignment characterized by PTFs can be generated simultaneously as the imaging system is adjusted so as to reduce the misalignment using the technique 800.

Figure 10:
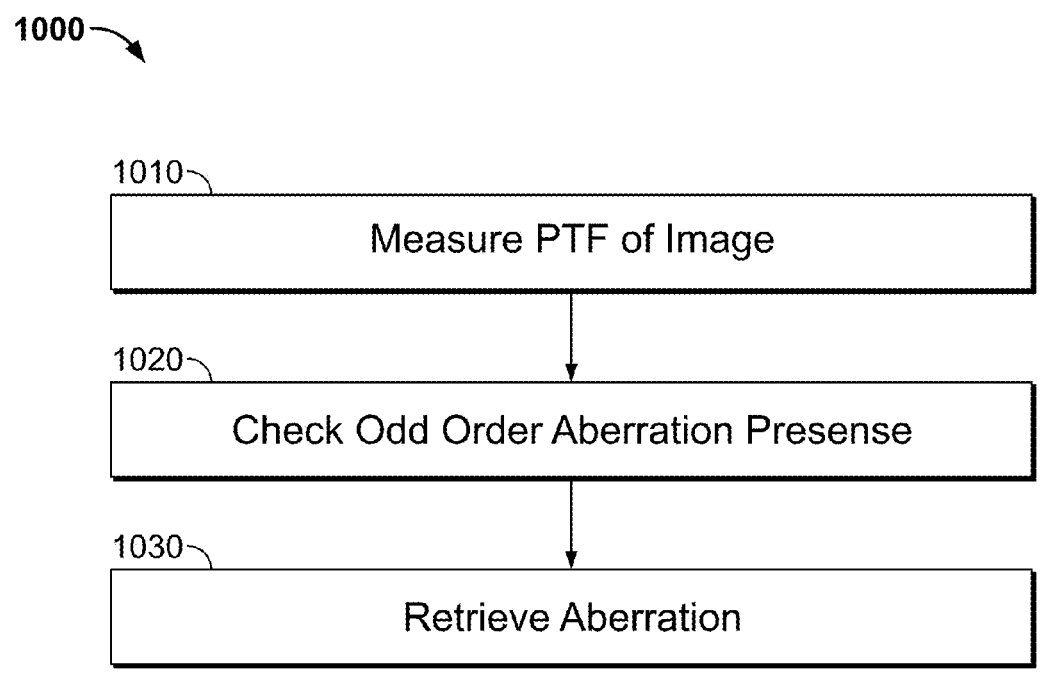
FIG. 10 is a flow chart illustrating a PTF-based image processing technique for retrieving aberration.

FIG. 10 is a flow chart illustrating a PTF-based image processing technique 1000 for retrieving aberration. At 1010, a PTF of a digital image captured with an imaging system is measured. At 1020 an odd order aberration presence is checked. For example, the PTF can be used to check if the odd order aberrations are present in the system or not. An absence of non-linearity in the PTF would tell that there is no odd order aberration in the system; otherwise odd order aberration can be present. To demonstrate the dependence of the PTF on the odd order aberrations, we have shown the PTFs for various Zernike aberration polynomials (ZAP). ZAP may be normalized in various methods. In the comparison presented in FIGS. 12A, 12B, and 12C, the ZAP is normalized using standards disclosed by Thibos et al. (*Vision Science and its Applications*, 2000).

Figure 12A:
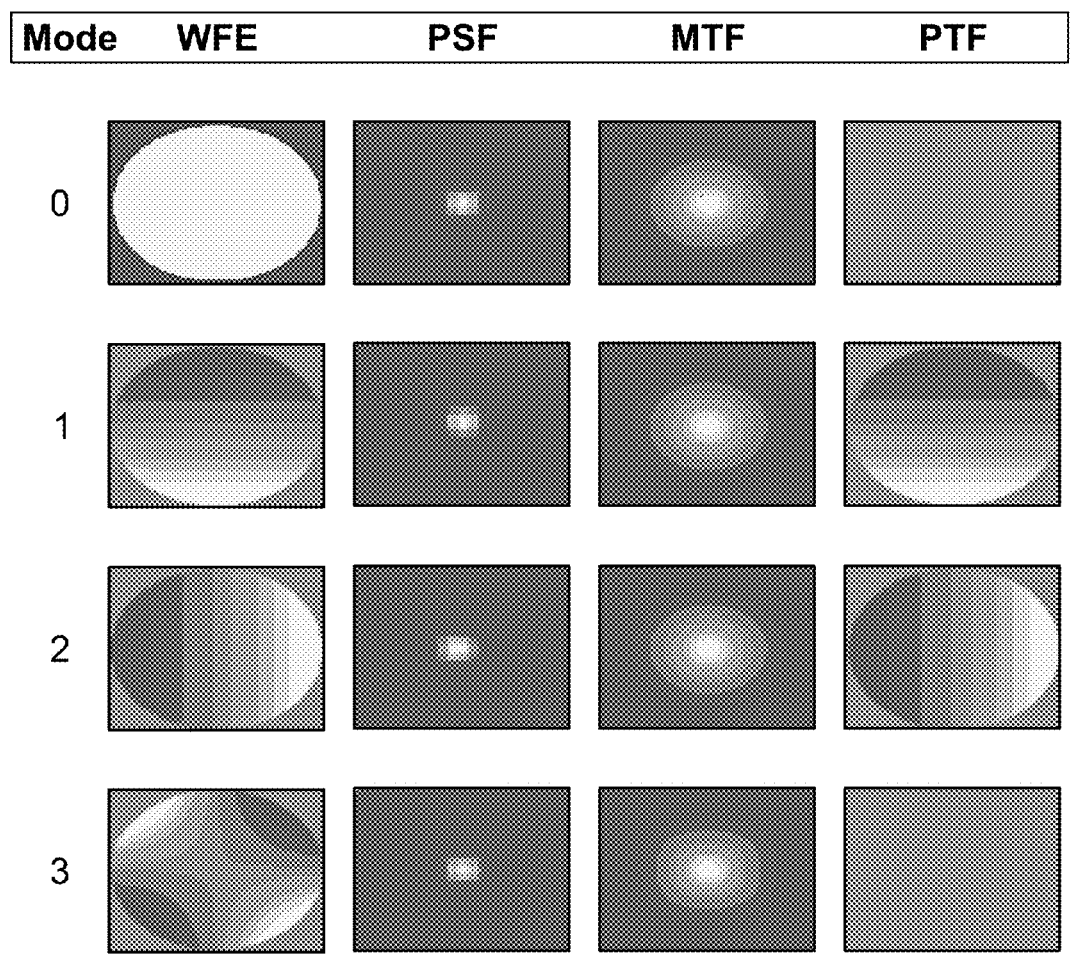
FIGS. 12A, 12B, and 12C are comparisons to the first 24 modes of Zernike aberration polynomials with PTF and other different functions used in image processing.
Figure 12B:
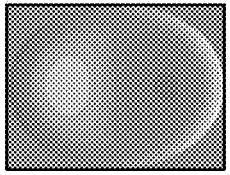
Figure 12B:
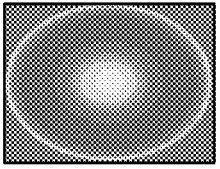
Figure 12C:
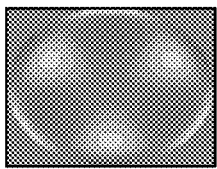
Figure 12C:
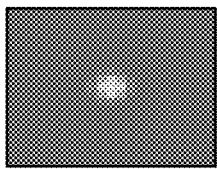
Figure 12C:
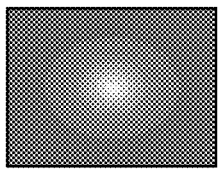
Figure 12C:
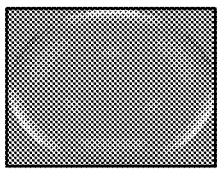
Figure 12C:
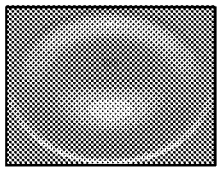
Figure 12C:
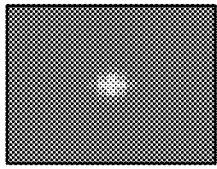
Figure 12C:
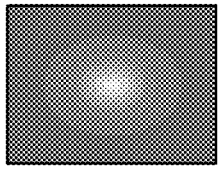
Figure 12C:
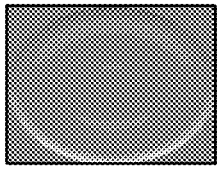
Figure 12C:
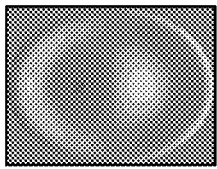
Figure 12C:
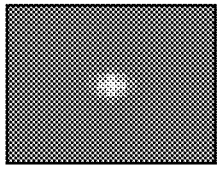
Figure 12C:
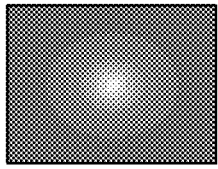
Figure 12C:
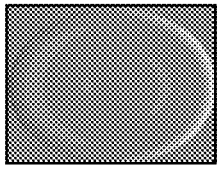
Figure 12C:
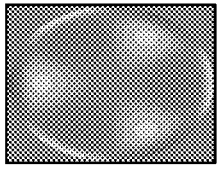
Figure 12C:
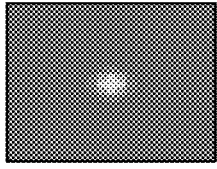
Figure 12C:
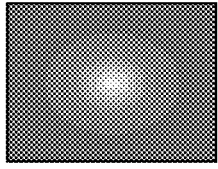
Figure 12C:
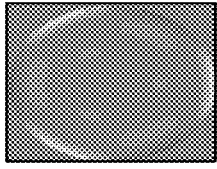
Figure 12C:
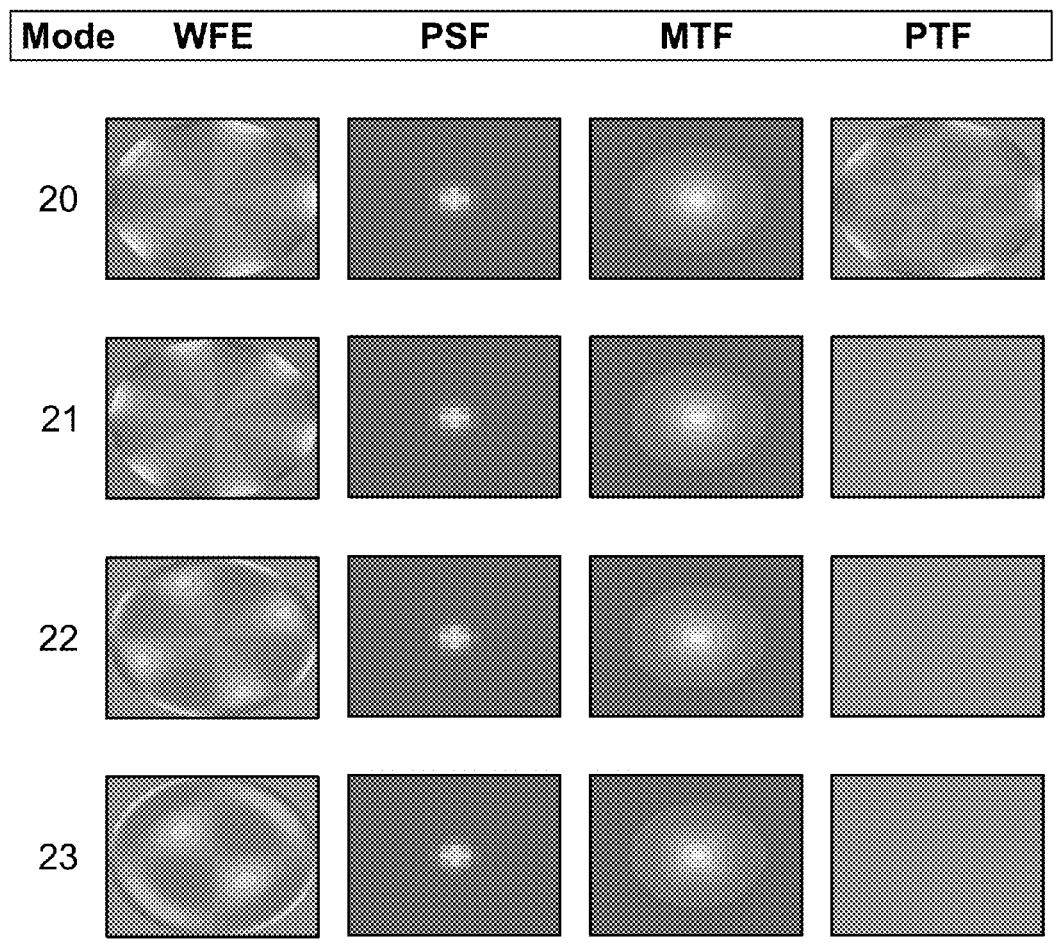

Temporarily referring to FIGS. 12A, 12B, and 12C, which demonstrate the relationship between the PTF and the ZAP, as well as other functions. In these three figures, the first columns indicates ZAP mode, second column shows the WFE due to ZAP and the third, fourth and fifth columns shows the PSF, the MTF and the PTF, respectively. It is shown that the PTF is zero for higher order ZAP as long as it is even only. Similarly, for odd order ZAPs, the PTF correlated closely with the WFE. Both of these observations could be used for applications such as aberration retrieval and the adaptive computational imaging. For example, in lithography, the goal is to design an optical system that does not have any odd order aberrations since it results in the phase distortion (due to non-linear PTF). An image-based PTF measurement could help identify if there is any PTF presence in the image and the absence of the PTF is a clear indicator of the absence of odd-order aberrations in the system. Furthermore, PTF could be useful in quantifying the extent of odd order aberrations in the system. At 1030, the aberration of the imaging system based on the odd order aberration presence can be retrieved. In some embodiments, PTF can be used to estimate the strength of the cubic phase mask in a case of coma. However, other embodiments using the technique 1000 for aberration retrieval are possible.

A useful application of the PTF is in characterizing CPM imaging systems where the effective strength $\alpha$ of the cubic phase mask is to be estimated. In general, the value of $\alpha$ would be a known quantity since it is a design parameter of the phase mask. However, scenarios could exist where the effective value of $\alpha$ differs from that given by specifications. For instance, when the cubic phase mask is placed in an imaging system with a variable aperture, the effective strength of the mask would vary depending on the size of the aperture. Another example is when the mask is placed at a location other than the traditionally prescribed pupil planes within the imaging chain. In such a situation, the functional strength of the phase mask would deviate from the design specification of $\alpha$. Estimating the true value of $\alpha$ would then be required in such scenarios.

In principle, $\alpha$ may be estimated from either the MTF or the PTF as described by Eq. (9). However, it is herein demonstrated that the PTF can be a more robust metric than the MTF in estimating this parameter. In the following exercise, a polynomial curve fitting approach is used to determine the value of $\alpha$. For the sake of simplicity, only those MTF and PTF values for which u>0 are considered.

The right-hand side of the MTF equation in Eq. (9) consists of two components. The first component indicates a polynomial relationship between the MTF M and the spatial frequency u. The second term is a scaled function of Fresnel integrals which oscillates rapidly about unity as a function of u. For a low-order polynomial curve fitting approach, this term may hence be ignored. As a result, only the stationary phase component of the overall MTF is utilized in this application. The MTF in terms of this component is then $M=[\pi/(24\alpha u)]^{1/2}$, which may be rewritten as $$\alpha u = \frac{\pi}{24M^2}. \quad (15)$$

Upon curve-fitting the right-hand side of the above equation to a first-order polynomial with respect to u, namely a straight line, the resulting coefficient of the first degree exponent yields the slope of the fit, which is also the value of $\alpha$. It is apparent from Eq. (15) that the above polynomial in u is highly sensitive to the MTF. It is further noted that larger values of $\alpha$ serve to lower the MTF. If the MTF used in the estimation is then lower than that predicted by Eq. (9) due to a host of system or environmental factors, this reduced MTF would result in a higher but erroneous estimate of $\alpha$. Given that the system MTF is almost always lower that its theoretical optical-only counterpart, using the measured MTF to estimate this parameter would virtually assure incorrect results.

In the case of the PTF, the first term, namely $2\alpha u^3$, is a cubic exponent with respect to u and only contains the parameter $\alpha$ within its coefficient. The second term $2\omega^2 u/(3\alpha)$ is a linear function of u and a quadratic function of $\psi$. In the previous subsection, we have demonstrated that the quadratic dependence on $\psi$ may be exploited to locate the in-focus plane of a CPM imaging system. The third term contributes to a rapid oscillation of the PTF about $\pi/4$ radians within the available spatial frequency bandwidth of the system. This term may therefore be ignored in a low-order polynomial estimation problem. The equation used for curve-fitting would then be $$2\alpha u^3 - \frac{2\psi^2}{3\alpha}u = \Theta. \quad (16)$$

The advantage of using the PTF to estimate $\alpha$ as opposed to the MTF is that most measurement errors tend to introduce a linear phase error as explained earlier, which would affect the second term on the left-hand side of Eq. (5.4). On the other hand, the first term containing the cubic exponent in u is independent of defocus or other linear effects. Thus, in the absence of optical aberrations specifically contributing to the cubic exponent in the above equation, the coefficient of this exponent directly yields an estimate of $\alpha$ while remaining largely unaffected by noise or other measurement errors. Practical utility of this approach is herein demonstrated via theoretical and experimental data.

Figure 11A:
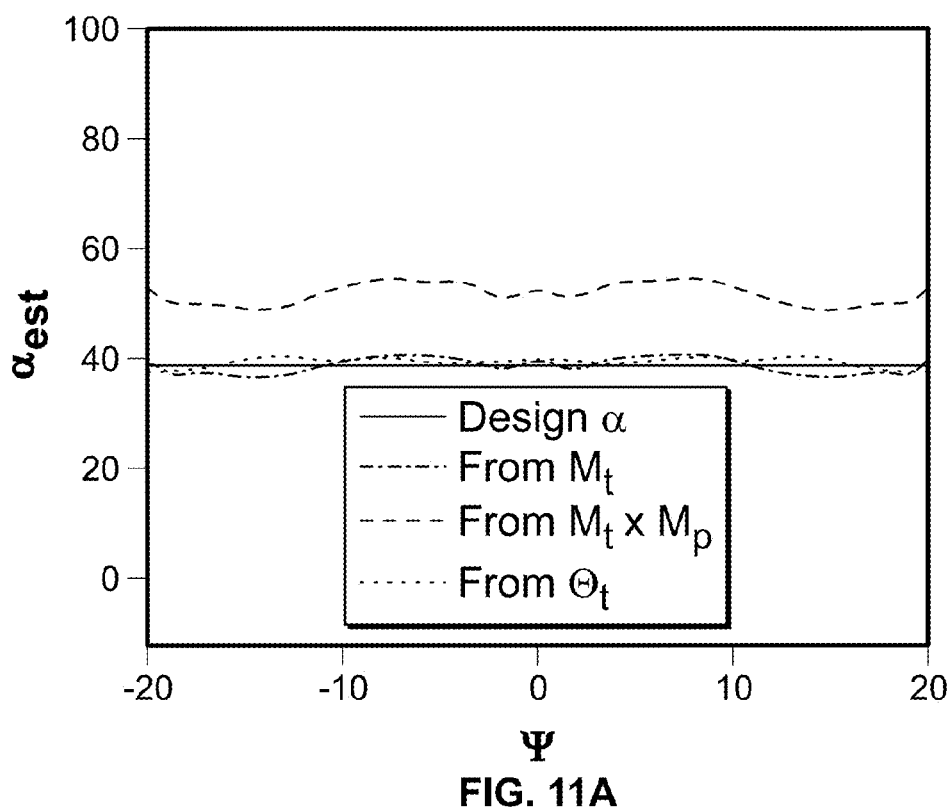
FIGS. 11A and 11B are showing parameter estimation related to different situations.
Figure 11B:
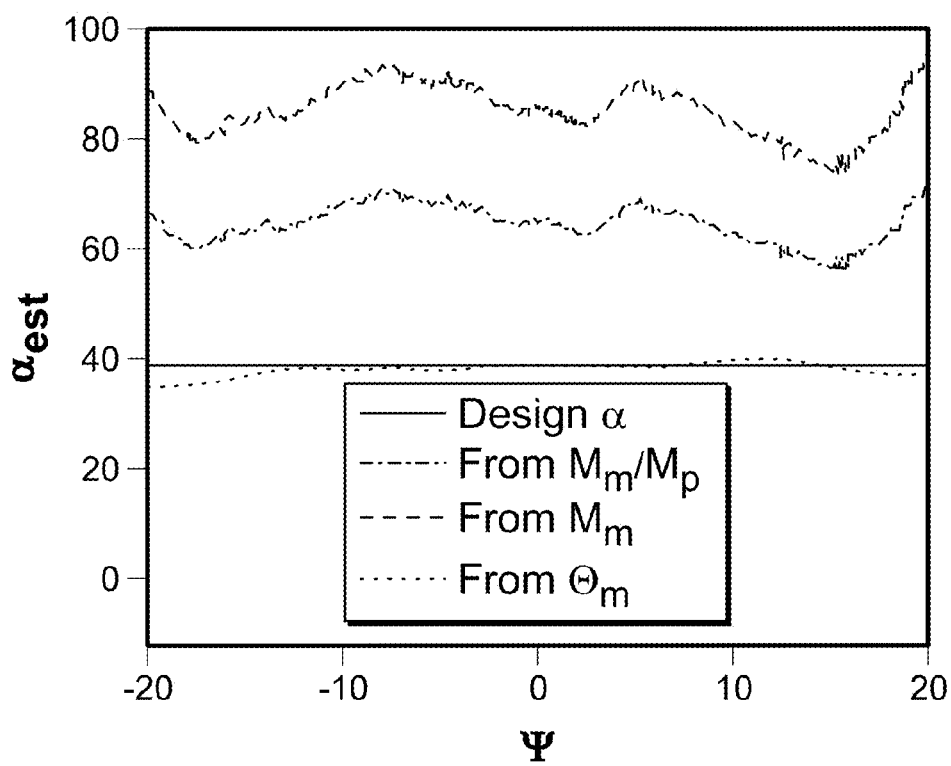

Estimation of $\alpha$ was performed using three theoretical data sources theoretical MTF ($M_t$), combination of the theoretical MTF and the pixel MTF ($M_t \times M_p$), and the theoretical PTF ($\Theta_t$), and three experimental sources, namely measured MTF ($M_m$), the ratio of the measured MTF and the pixel MTF ($M_m/M_p$), and measured PTF ($\Theta_m$). The experimental data is from the set up similar to the one described in previous section for depth of field characterization. It is noted that no linear or other phase correction was employed on the experimentally measured PTF $\Theta_m$ prior to its use in the estimation exercise. The value of $\alpha$ was estimated for each data source corresponding to a given defocus value within the range $-20 \le \psi \le 20$ and then averaged. The curve-fitting approach used normalized spatial frequencies $u_{est}$ within the range $0 \le u_{est} \le u_{cc}$ as the base variables whose coefficients were to be estimated. To ensure consistency across all $\psi$, the value of $u_{cc}$ was kept constant throughout this range. The value of $u_{cc}$ was determined by inspecting the measured MTF at $\psi=20$ and identifying the actual cutoff frequency $u_{ca}$ at this defocus value. The upper limit $u_{cc}$ was then chosen to be $0.95 u_{ca|\psi=20}$. Turning briefly to FIGS. 11A and 11B, FIGS. 11A and 11B present the results of the above exercise. Each curve represents the estimated value of $\alpha$, namely $\alpha_{est}$, from one of the abovementioned data sources and across the specified range of defocus values. Estimates from theoretical data are shown in FIG. 11A while those from experimental data are illustrated in FIG. 11B.

Table 1 shows the resulting mean estimates of $\alpha$ from each of the data sources. The numbers shown in green represent reasonably accurate estimates, while those in red indicate unreliable results.

TABLE 1

Mean values of estimates of the cubic phase mask strength $\alpha$ across a defocus

| Data source | $M_t$ | $M_t \times M_p$ | $\Theta_t$ | $M_m$ | $M_m/M_p$ | $\Theta_m$ |
|---|---|---|---|---|---|---|
| Mean $\alpha_{est}$: | 38.644 | 51.727 | 39.367 | 85.095 | 64.445 | 38.067 | range of $-20 \le \psi \le 20$, based on MTF and PTF data corresponding to a design value of $\alpha=38.822$.

FIG. 11A shows that both $M_t$ and $\Theta_t$ yield reasonably close estimates of $\alpha$ as expected, whereas the result obtained by evaluating $M_t \times M_p$ shows a significant error amounting to a deviation of roughly 33% from the design value. It is seen that the estimate of $\alpha$ from $M_m$ produced an error of nearly 120%. Attempting to raise the measured MTF by the pixel MTF does little to help as seen in FIG. 11B, since $M_m/M_p$ would remain below $M_t$ considering that $M_t \times M_p$ is higher than $M_m$, especially at higher frequencies.

Inspecting the results obtained from the PTFs, it is seen that the measured PTF $\Theta_m$ yields a value of $\alpha_{est}$ that is very close to the design value, with an error of less than 2%. This is in spite of the fact that $\Theta_m$ is lower than $\Theta_t$ due to linear correction term, as discussed in Chapter 4. Given that the correction factor $\Theta_c$ is a strictly linear function, it does little to influence the estimation of a via the cubic exponent $\alpha u^3$. It is therefore seen that the PTF is a far better metric than the MTF in estimating the strength $\alpha$ of a cubic phase mask imaging system.

The image processing methods described above can use various PTF measurement techniques to obtain the required PTF in the process. In some implementations, a particular PTF measurement technique can be used in a manner consistent with the co-pending application Ser. No. 13/026,141 filed on Feb. 11, 2011.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based, at least in part, on one or more other items or operations and may be based exclusively, partially, primarily, secondarily, directly, or indirectly on the one or more other items or operations.

A number of embodiments of the invention have been described. Nevertheless, it will be understood that various modifications may be made without departing from the spirit and scope of the invention. Accordingly, other embodiments are within the scope of the following claims.

What is claimed is:

1. A method for digital image processing, comprising:
   measuring a first phase transfer function (PTF) of an imaging system based on a first digital image, wherein the imaging system includes an optical component and a detector system;
   measuring a second PTF of the imaging system based on a second digital image, wherein the second digital image captures a laterally shifted version of the first digital image;
   comparing the first PTF with the second PTF; and
   determining a lateral shift of the second image to the first image.

2. The method of claim 1, further comprising:
   comparing a first derivative of the first PTF with a first derivative of the second PTF, wherein both of the first derivatives are scaled by $2\pi$.

3. The method of claim 1, wherein the laterally shifted version registers a sub-pixel accuracy in a digital image.

4. The method of claim 1, wherein a sub-pixel shift comprises translation information within a pixel size of the first image and the second image.

5. The method of claim 1, wherein a sub-pixel shift is used in determining high spatial detail information.

6. A method for digital image processing, comprising:
   measuring a PTF from one or more digital images;
   calculating a first derivative of the PTF from the one or more digital images;
   determining a spatial frequency above which aliasing occurs based, at least in part, on one or more of calculated first derivatives of the PTFs from one or more digital images; and
   estimating an extent of aliasing in a digital image using the spatial frequency to increase accuracy of information retrieval from that digital image.

7. The method of claim 6, further comprising estimating an optical cut-off frequency of the digital imaging system based, at least in part, on the above determined spatial frequency above which aliasing occurs and a pixel pitch.

8. The method of claim 6, wherein determining the spatial frequency above which aliasing occurs comprises identifying a discontinuity in the one or more calculated first derivatives of the PTFs.

9. The method of claim 8, wherein identifying a discontinuity in the one or more calculated first derivatives of the PTFs comprises calculating a second derivative of the calculated PTFs.

10. A method for digital image processing, comprising:
    capturing a digital image generated from an imaging system using a phase mask, the imaging system includes an optical component having an optical axis and a detector system;
    measuring phase transfer functions (PTFs) of the imaging system at several locations along the optical axis;
    determining a through-focus PTF at a spatial frequency based, at least in part, on the measured PTFs, the through-focus PTF maps PTF values for the spatial frequency to the several locations along the optical axis; and
    identifying one or more locations along the optical axis for which the through focus PTF exhibits an extremum.

11. The method of claim 10, wherein the through focus PTF is used to identify optimal configuration of the system components based, at least in part, on the location along the optical axis for which the through focus PTF exhibits an extremum.

12. The method of claim 10, wherein the through focus PTF is used to identify the depth information of objects represented in the digital image.

13. A method for correcting misalignment in an imaging system, the method comprising:
    measuring a first phase transfer function (PTF) of the imaging system, wherein the imaging system includes an optical component and a detector system;
    comparing the measured PTF with a reference PTF; and
    adjusting at least one optical component of the imaging system based, at least in part, on the PTF measured and the reference PTF, where the adjusting reduces a misalignment error.

14. The method of claim 13, wherein the reference PTF is determined from an optics prescription for the imaging system.

15. The method of claim 13, wherein the sign and magnitude of the measured PTF corresponds to the sign and the magnitude of the misalignment error.

16. The method of claim 13, wherein the misalignment error comprises a difference between a current position and an aligned position.

17. The method of claim 13, wherein reducing the misalignment error further comprises using a closed loop iteration, the closed loop iteration comprising measuring a number of a plurality of updated PTFs and adjusting one less the same number of a plurality of optical component adjustments.

18. A method for detecting odd-order aberrations in a digital imaging system, comprising:
    measuring a phase transfer function (PTF) of an imaging system based on a capture digital image, wherein the imaging system includes an optical component and a detector system;

determining an absence or a presence of odd order aberrations based on a linearity of the PTF; and when a presence of odd order aberrations is determined, identifying that a current configuration of the digital imaging system has a misalignment error.

19. A method for measuring the strength of a phase mask of a wavefront coding imaging system, comprising:

measuring a phase transfer function (PTF) of a digital image captured with the imaging system; and estimating the parameters of the phase mask to match the measured PTF.

* * * * *